US012025014B2

(12) United States Patent
Tsukada et al.

(10) Patent No.: US 12,025,014 B2
(45) Date of Patent: Jul. 2, 2024

(54) PIT INITIATION EVALUATION SYSTEM, AND, PIT INITIATION EVALUATION METHOD

(71) Applicant: TOSHIBA ENERGY SYSTEMS & SOLUTIONS CORPORATION, Kawasaki (JP)

(72) Inventors: Yuka Tsukada, Yokohama (JP); Kazuhiro Saito, Yokohama (JP); Yusuke Suzuki, Yokohama (JP); Yoshikazu Ninomiya, Nerima (JP); Osamu Tanaka, Yokohama (JP); Yasuteru Kawai, Yokohama (JP); Shinichi Terada, Yokohama (JP); Makoto Sasaki, Kawasaki (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/052,018

(22) Filed: Nov. 2, 2022

(65) Prior Publication Data

US 2024/0068380 A1 Feb. 29, 2024

(30) Foreign Application Priority Data

Aug. 23, 2022 (JP) ................................ 2022-132393

(51) Int. Cl.
*F01D 21/10* (2006.01)

(52) U.S. Cl.
CPC .......... *F01D 21/10* (2013.01); *F05D 2220/31* (2013.01)

(58) Field of Classification Search
CPC ... F01D 25/007; F01K 13/003; F05D 2220/31
See application file for complete search history.

(56) References Cited

U.S. PATENT DOCUMENTS

2011/0239649 A1* 10/2011 Myougan .................. F03G 7/04 60/641.2
2012/0128469 A1* 5/2012 Kato ...................... G01N 17/02 702/30

(Continued)

FOREIGN PATENT DOCUMENTS

JP 7-54607 A 2/1995
JP 9-287408 A 11/1997

(Continued)

OTHER PUBLICATIONS

Office Action issued Feb. 21, 2024, in Australian Patent Application No. 2022265940 in English.

(Continued)

*Primary Examiner* — Woody A Lee, Jr.
*Assistant Examiner* — Cameron A Corday
(74) *Attorney, Agent, or Firm* — Oblon, McClelland, Maier & Neustadt, L.L.P.

(57) ABSTRACT

There is provided a pit initiation evaluation system or the like capable of predicting pit initiation effectively and at low cost. In a pit initiation evaluation system of an embodiment, a pit initiation evaluation unit creates and retains, based on a dry-wet alternate time data, a deposit impurity concentration data, and a pit initiation data on pitting corrosion initiated in each of a plurality of turbine stages when an operation is actually performed in the steam turbine, a pit initiation evaluation table presenting a relationship between a dry-wet alternate time, a deposit impurity concentration, and pit initiation. Further, the pit initiation evaluation unit is configured to evaluate, by using the pit initiation evaluation table, pitting corrosion to be initiated in each of the plurality of turbine stages in an operation planned for the steam turbine.

4 Claims, 10 Drawing Sheets

(56) References Cited

U.S. PATENT DOCUMENTS

| | | | | |
|---|---|---|---|---|
| 2015/0362426 | A1* | 12/2015 | Nishino | G01N 21/3554 356/437 |
| 2021/0172343 | A1* | 6/2021 | Tsukuda | F01K 13/003 |

FOREIGN PATENT DOCUMENTS

| | | | |
|---|---|---|---|
| JP | 2002-73155 | A | 3/2002 |
| JP | 2004-308522 | A | 11/2004 |
| JP | 3718377 | B2 | 11/2005 |
| JP | 2011-202864 | A | 10/2011 |
| JP | 5487112 | B2 | 5/2014 |

OTHER PUBLICATIONS

Shengqi Zhou, et al., "Steam Turbine Operating Conditions, Chemistry of Condensates, and Environment Assisted Cracking—A Critical Review", NPL Report Matc (A) 95, May 2002, 78 pages.

* cited by examiner

PIT INITIATION EVALUATION SYSTEM, AND, PIT INITIATION EVALUATION METHOD

CROSS REFERENCE TO RELATED APPLICATION

This application is based upon and claims the benefit of priority from Japanese Patent Application No. 2022-132393, filed on Aug. 23, 2022; the entire contents of which are incorporated herein by reference.

FIELD

Embodiments described herein relate generally to a pit initiation evaluation system, and, a pit initiation evaluation method.

BACKGROUND

A steam turbine power generation system is structured such that a steam turbine converts heat energy of steam into kinetic energy, and a generator converts the converted kinetic energy into electric power.

In the steam turbine, the steam supplied as a working medium undergoes a decrease in temperature and a decrease in pressure as it flows from a high-pressure part to a low-pressure part, which increases wetness of the steam. Therefore, in the steam turbine, a dry-wet alternate zone in which a transition from dry steam (water vapor not in coexistence with saturated liquid-phase water) to wet steam (water vapor in coexistence with saturated liquid-phase water) takes place is present. For an axial flow turbine in which the steam turbine is constituted by a high-pressure turbine, an intermediate-pressure turbine, and a low-pressure turbine, and a plurality of turbine stages are arranged in an axial direction of a turbine rotor, the dry-wet alternate zone sometimes develops in the turbine stages located on the rear-stage side in the low-pressure turbine, for example. Other than this, the dry-wet alternate zone sometimes develops in an intermediate-pressure turbine constituting a geothermal power plant, for example.

In the dry-wet alternate zone, the concentration of impurities contained in the steam occurs. The concentration of impurities occurs in a gap interposed between an implanted portion of a rotor blade and a turbine rotor implanted with the implanted portion of the rotor blade in particular. The impurities are Na, Cl, $SO_4$, and so on, and on a surface of a turbine composing member such as the implanted portion of the rotor blade, due to the concentration of impurities, a deposit to corrode the turbine composing member is accumulated. As a result, the progress of the corrosion of the turbine composing member sometimes initiates pitting corrosion in the turbine composing member to develop into stress corrosion cracking (SCC) or corrosion fatigue damage.

When a peak-load power generation method is employed, to adjust a power output to a demand of electric power, steam is sometimes supplied to the steam turbine at a steam flow rate different from that in a rated operation, which develops the dry-wet alternate zone in a position different from that in the rated operation.

As an anticorrosion technique of preventing the corrosion of turbine composing members, various methods have been known. For example, such control of an amount of dissolved oxygen dissolved in system water and pH of the system water as AVT (All Volatile Treatment) and CWT (Combined Water Treatment) has been proposed. Further, a technique of monitoring a corrosive environment inside the steam turbine, a technique of controlling the corrosive environment by injecting a reducing agent inside the steam turbine, and the like have been proposed.

However, conventionally, pit initiation is not easy to predict effectively and at low cost. Therefore, the occurrence of stress corrosion cracking and corrosion fatigue damage is sometimes difficult to sufficiently inhibit.

Hence, a problem to be solved by the present invention is to provide a pit initiation evaluation system and a pit initiation evaluation method capable of predicting the pit initiation effectively and at low cost.

DETAILED DESCRIPTION

Figure 1:
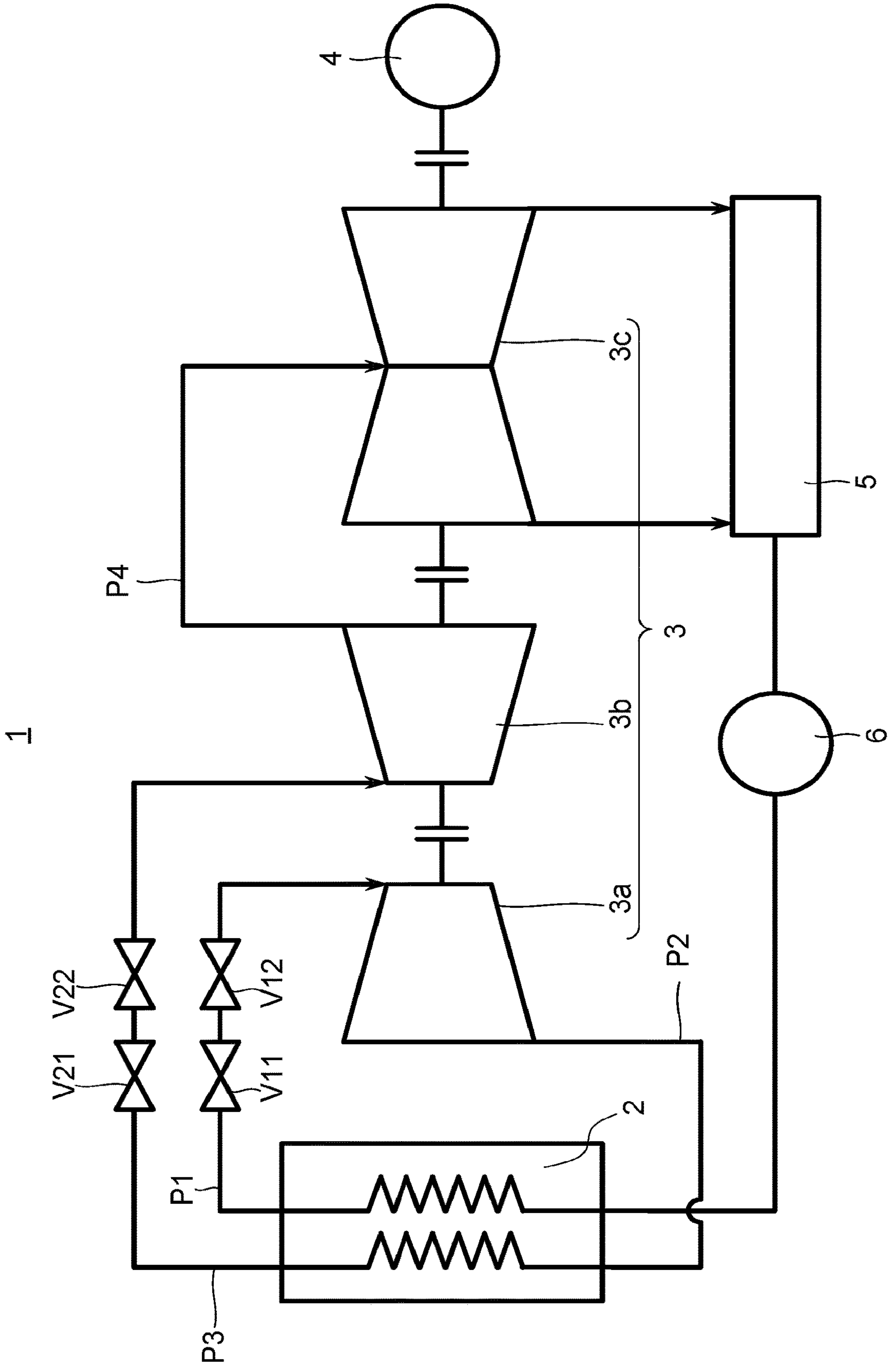
FIG. 1 is a diagram schematically illustrating one example of a steam turbine power generation system 1 according to an embodiment.

A pit initiation evaluation system of an embodiment is configured to evaluate pitting corrosion to be initiated in each of a plurality of turbine stages in a steam turbine power generation system. Here, a steam turbine power generation system includes a steam turbine and a generator. The steam turbine is structured such that the plurality of turbine stages are arranged in an axial direction along a rotation center axis of a turbine rotor, and steam supplied from a steam source expands and works in sequence in each of the plurality of turbine stages to thereby rotate the turbine rotor. The generator is structured to generate electricity by rotation of the turbine rotor to thereby output electric power. The pit initiation evaluation system of the embodiment includes a turbine operating state evaluation unit, a dry-wet alternate time calculation unit, a deposit impurity concentration calculation unit, and a pit initiation evaluation unit. The turbine operating state evaluation unit calculates a rate of a power output amount in which the generator outputs electric power when an operation is actually performed in the steam turbine to a rated power output amount in which the generator generates electricity when a rated operation is performed in the steam turbine, which is output as a turbine operating data. The dry-wet alternate time calculation unit calculates, based on the turbine operating data output by the turbine operating state evaluation unit, a dry-wet alternate time during which a dry-wet alternate zone develops in each of the plurality of turbine stages when the operation is actually performed in the steam turbine, which is output as a dry-wet alternate time data. The deposit impurity concentration calculation unit calculates, based on a steam temperature data on a temperature of steam supplied to the steam turbine when the operation is actually performed in the steam turbine, a steam flow rate data on a steam flow rate of the steam supplied to the steam turbine when the operation is actually performed in the steam turbine, a working medium impurity concentration data on a working medium impurity concentration which is an impurity concentration of the steam supplied to the steam turbine when the operation is actually performed in the steam turbine, and the dry-wet alternate time data output by the dry-wet alternate time calculation unit, a deposit impurity concentration which is an impurity concentration of a deposit accumulated on each of the plurality of turbine stages when the operation is actually performed in the steam turbine, which is output as a deposit impurity concentration data. The pit initiation evaluation unit creates and retains, based on the dry-wet alternate time data output by the dry-wet alternate time calculation unit, the deposit impurity concentration data output by the deposit impurity concentration calculation unit, and a pit initiation data on pitting corrosion initiated in each of the plurality of turbine stages when the operation is actually performed in the steam turbine, a pit initiation evaluation table presenting a relationship between the dry-wet alternate time, the deposit impurity concentration, and the pit initiation. Further, the pit initiation evaluation unit is configured to evaluate, by using the pit initiation evaluation table, pitting corrosion to be initiated in each of the plurality of turbine stages in an operation planned for the steam turbine.

[A] Structure of Steam Turbine Power Generation System 1

FIG. 1 is a diagram schematically illustrating one example of a steam turbine power generation system 1 according to an embodiment.

The steam turbine power generation system 1 includes a steam source 2 (boiler), a steam turbine 3, a generator 4, a steam condenser 5, and a feed pump 6, as illustrated in FIG. 1. In this embodiment, the steam turbine 3 includes a high-pressure turbine 3*a*, an intermediate-pressure turbine 3*b*, and a low-pressure turbine 3*c*, and is driven by supplying steam generated in the steam source 2 as a working medium.

In the steam turbine power generation system 1 of this embodiment, the steam (main steam) generated in the steam source 2 is introduced as a working fluid to the high-pressure turbine 3*a* via a main steam pipe P1 in which a main steam stop valve V11 and a steam control valve V12 are installed, to work in the high-pressure turbine 3*a*. Then, the steam discharged from the high-pressure turbine 3*a* is supplied to the steam source 2 via a low-temperature reheat steam pipe P2, to be reheated.

The steam reheated in the steam source 2 (reheat steam) is introduced as the working fluid to the intermediate-pressure turbine 3*b* via a high-temperature reheat steam pipe P3 in which a reheat steam stop valve V21 and an intercept valve V22 are installed, to work in the intermediate-pressure turbine 3*b*. Then, the steam discharged from the intermediate-pressure turbine 3*b* is introduced as the working fluid to the low-pressure turbine 3*c* via a crossover pipe P4, to work in the low-pressure turbine 3*c*. Then, the steam discharged from the low-pressure turbine 3*c* is condensed in the steam condenser 5.

The water condensed in the steam condenser 5 (condensed water) is pressurized in the feed pump 6. The water pressurized in the feed pump 6 (feedwater) is returned to the steam source 2.

In the steam turbine power generation system 1, the steam turbine 3 is connected with a turbine rotor between the high-pressure turbine 3*a*, the intermediate-pressure turbine 3*b*, and the low-pressure turbine 3*c*, and the turbine rotor is rotated by steam work. Then, the rotation of the turbine rotor constituting the steam turbine 3 drives the generator 4 to generate electricity.

[B] Structure of Low-Pressure Turbine 3*c*

Figure 2:
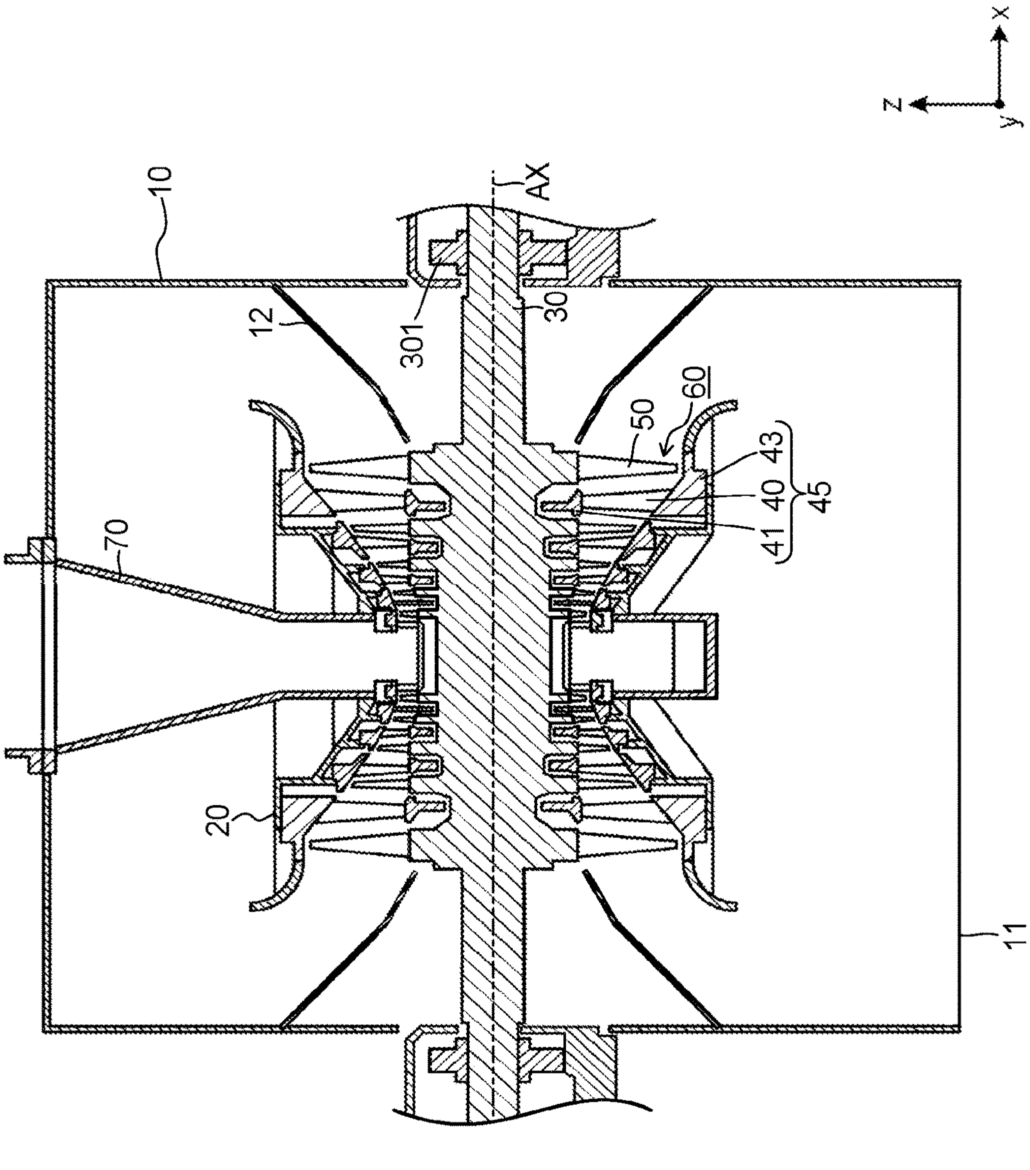
FIG. 2 schematically illustrates one example of a low-pressure turbine 3_c_ in the steam turbine power generation system 1 according to the embodiment.

FIG. 2 schematically illustrates one example of a low-pressure turbine 3*c* in the steam turbine power generation system 1 according to the embodiment. FIG. 2 illustrates a longitudinal section (xz plane), and, a longitudinal direction is a vertical direction z, a lateral direction is a first horizontal direction x, and a direction perpendicular to the paper surface is a second horizontal direction y.

As illustrated in FIG. 2, the low-pressure turbine 3*c* is of a double-flow type, and exemplifies a downward exhaust type which discharges the steam downward.

In this embodiment, the low-pressure turbine 3*c* has an outer casing 10, an inner casing 20, and a turbine rotor 30, and is structured such that the outer casing 10 houses the inner casing 20 inside and the turbine rotor 30 penetrates the inner casing 20 and the outer casing 10. The turbine rotor 30, whose rotation center axis AX is along the first horizontal direction x, is rotatably supported by a rotor bearing 301.

The low-pressure turbine 3*c* is a multistage axial-flow turbine, and is provided with a plurality of turbine stages 60 including a stator blade 40 and a rotor blade 50 in an axial direction along the rotation center axis AX inside the inner casing 20.

The stator blade 40 is more than one, and a plurality of stator blades 40 are arranged in a rotation direction of the turbine rotor 30 between a diaphragm inner ring 41 and a diaphragm outer ring 43 to thereby constitute a nozzle diaphragm 45.

The rotor blade 50 is more than one, and a plurality of rotor blades 50 are arranged along the rotation direction of the turbine rotor 30.

In the low-pressure turbine 3*c*, a steam supply pipe 70 is connected to the inner casing 20, and the steam is supplied as the working fluid to the steam supply pipe 70. The steam supplied to the steam supply pipe 70 flows through the plurality of turbine stages 60 in sequence inside the inner casing 20. That is, the working fluid flows from the initial turbine stage 60 toward the final turbine stage 60, and expands and works in each of the turbine stages 60. This causes the turbine rotor 30 to rotate with the rotation center axis AX serving as a rotation axis, and the generator (the illustration is omitted in FIG. 2. Corresponding to the generator 4 in FIG. 1) connected to the turbine rotor 30 generates electricity.

In the low-pressure turbine 3*c*, the steam passed through the final turbine stage 60 is discharged via a cone section 12 from a lower exhaust port 11 provided in the lower end portion of the outer casing 10. The steam discharged from the lower exhaust port 11 is condensed in the steam condenser (the illustration is omitted in FIG. 2. Corresponding to the steam condenser 5 in FIG. 1) to produce condensed water.

As previously described, in the low-pressure turbine 3*c* of the steam turbine 3, since wetness of the steam supplied as the working medium increases, a dry-wet alternate zone in which a transition from dry steam to wet steam takes place is sometimes present. In the dry-wet alternate zone, the concentration of impurities contained in the steam occurs. The concentration of impurities is likely to occur in a gap interposed between an implanted portion of the rotor blade 50 and the turbine rotor 30 implanted with the implanted portion of the rotor blade 50 in particular, and on a surface of a turbine composing member such as the implanted portion of the rotor blade 50, due to the concentration of impurities, a deposit to corrode the turbine composing member is accumulated. As a result, the progress of the corrosion of the turbine composing member sometimes initiates pitting corrosion in the turbine composing member to develop into stress corrosion cracking or corrosion fatigue damage.

[C] Configuration of Pit Initiation Evaluation System 700

Figure 3:
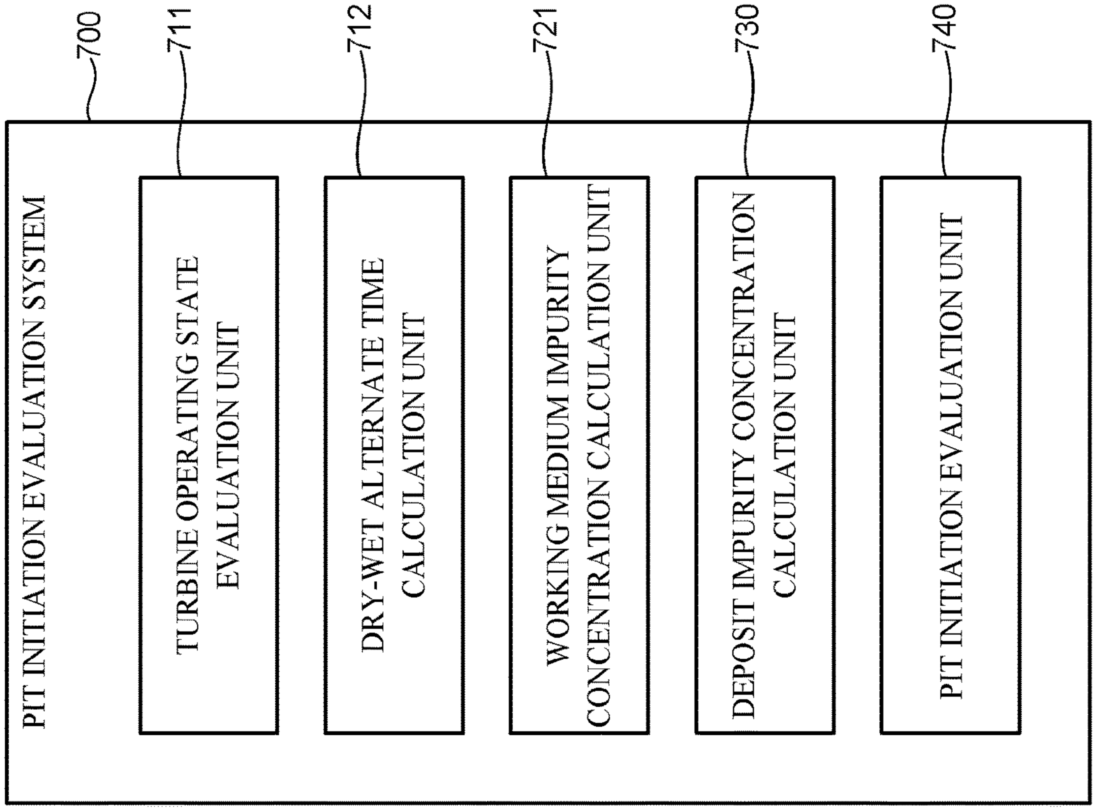
FIG. 3 is a block diagram schematically illustrating a pit initiation evaluation system 700 according to the embodiment.

FIG. 3 is a block diagram schematically illustrating a pit initiation evaluation system 700 according to the embodiment.

As illustrated in FIG. 3, the pit initiation evaluation system 700 has a turbine operating state evaluation unit 711, a dry-wet alternate time calculation unit 712, a working medium impurity concentration calculation unit 721, a deposit impurity concentration calculation unit 730, and a pit initiation evaluation unit 740.

The units of the pit initiation evaluation system 700 are configured to evaluate pitting corrosion to be initiated in each of the plurality of turbine stages 60 (refer to FIG. 2) constituting the steam turbine 3 (for example, the low-pressure turbine 3*c* illustrated in FIG. 2) in the steam turbine power generation system 1 including the steam source 2, the steam turbine 3, and the generator 4 (refer to FIG. 1).

The pit initiation evaluation system 700 includes a computer and a storage device, and by using programs stored in the storage device, arithmetic units function as the units constituting the pit initiation evaluation system 700.

[D] Operation of Pit Initiation Evaluation System 700

[D-1] for Creation of Pit Initiation Evaluation Table D740

In the pit initiation evaluation system 700, first, a pit initiation evaluation table D740 (refer to FIG. 5E described later) to be used for evaluation of pitting corrosion is created.

Figure 4:
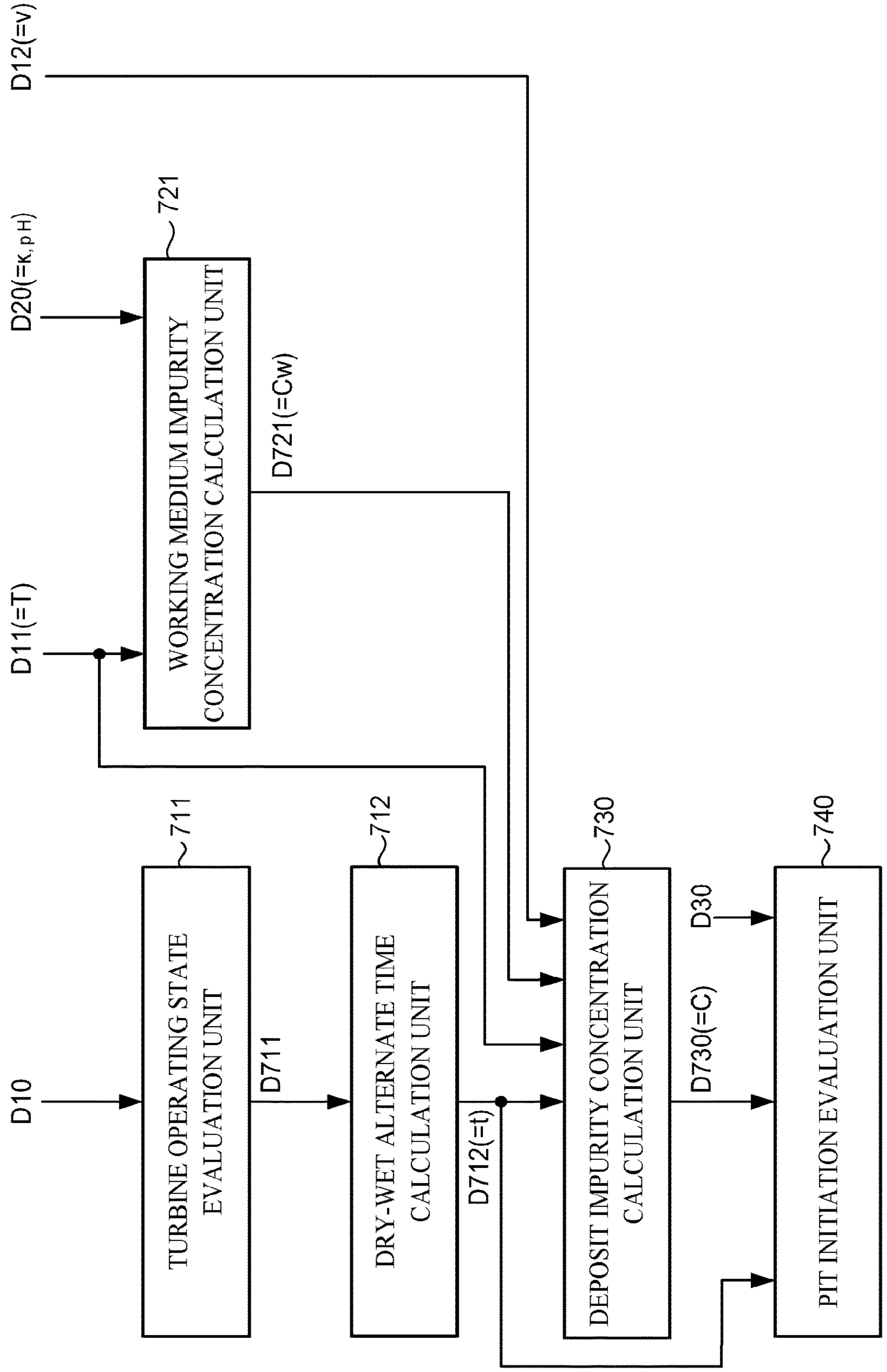
FIG. 4 is a diagram schematically illustrating a flow of data in creating a pit initiation evaluation table 740 in the pit initiation evaluation system 700 according to the embodiment.

FIG. 4 is a diagram schematically illustrating a flow of data in creating the pit initiation evaluation table D740 in the pit initiation evaluation system 700 according to the embodiment.

In the pit initiation evaluation system 700, the operation of each of the units for the creation of the pit initiation evaluation table D740 will be described using FIG. 4.

[D-1-1] Turbine Operating State Evaluation Unit 711

As illustrated in FIG. 4, the turbine operating state evaluation unit 711 is configured such that a power output data D10 is input thereto to output a turbine operating data D711 based on the power output data D10.

Figure 5A:
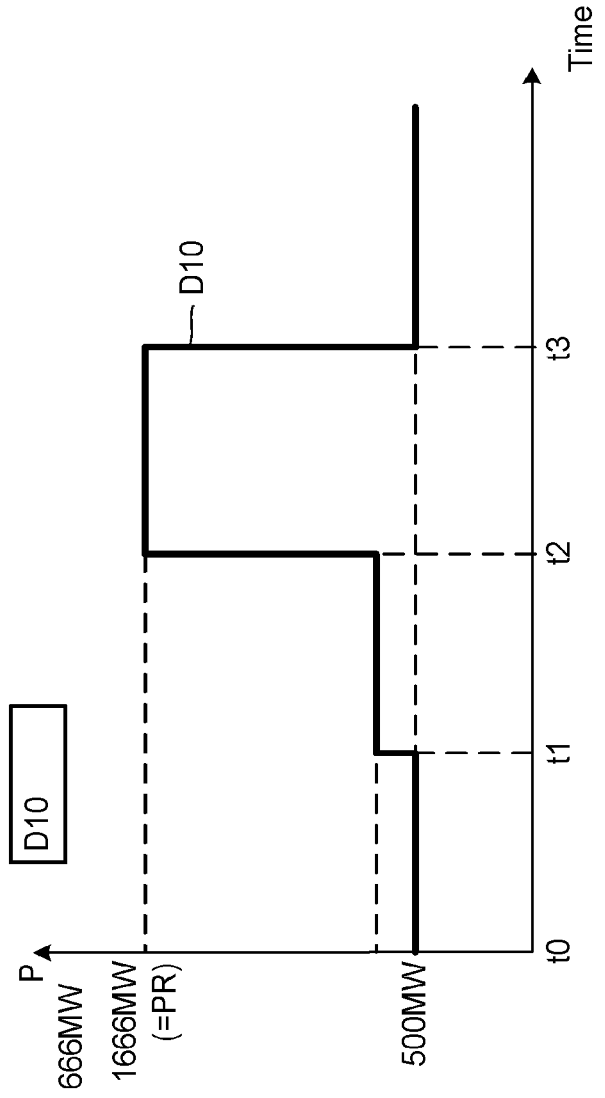
FIG. 5A is a chart illustrating one example of a power output data D10 in the embodiment.
Figure 5B:
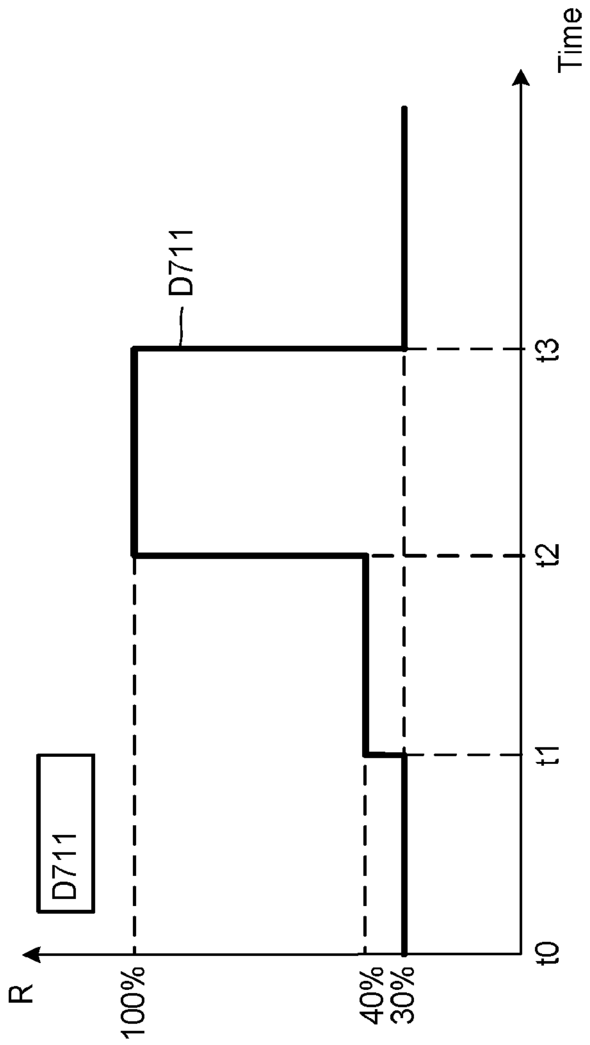
FIG. 5B is a chart illustrating one example of a turbine operating data D711 in the embodiment.

FIG. 5A is a chart illustrating one example of the power output data D10 in the embodiment. FIG. 5B is a chart illustrating one example of the turbine operating data D711 in the embodiment. FIG. 5A and FIG. 5B exemplify an operating time, including a time from a time point t0 to a time point t3, when the steam turbine 3 is operated.

As illustrated in FIG. 5A, the power output data D10 is data on a power output amount P in which the generator 4 outputs electric power when an operation is actually performed in the steam turbine 3. That is, the power output data D10 is data relating the power output amount P (MW) to an operating time (Time) of the steam turbine 3.

As illustrated in FIG. 5B, the turbine operating data D711 is data on a rate R (%) of the power output amount P in which the generator 4 outputs the electric power when the operation is actually performed in the steam turbine 3 to a rated power output amount PR in which the generator 4 generates electricity when a rated operation is performed in the steam turbine 3 (R=100*P/PR). That is, the turbine operating data D711 is data on a load condition of the steam turbine 3, and data relating the operating time (Time) of the steam turbine 3 to the above-described rate R (%).

In this manner, the turbine operating state evaluation unit 711 calculates the rate R of the power output amount P in which the generator 4 outputs the electric power when the operation is actually performed in the steam turbine 3 (=power output data D10) to the rated power output amount PR in which the generator 4 generates electricity when the rated operation is performed in the steam turbine 3. Then, the turbine operating state evaluation unit 711 outputs the data on the above-described calculated rate R as the turbine operating data D711.

[D-1-2] Dry-Wet Alternate Time Calculation Unit 712

As illustrated in FIG. 4, the dry-wet alternate time calculation unit 712 is configured such that the turbine operating data D711 is input thereto to output a dry-wet alternate time data D712 based on the turbine operating data D711. The dry-wet alternate time data D712 is data on a dry-wet alternate time t during which the dry-wet alternate zone develops in each of the plurality of turbine stages 60 when the operation is actually performed in the steam turbine 3.

Figure 5C:
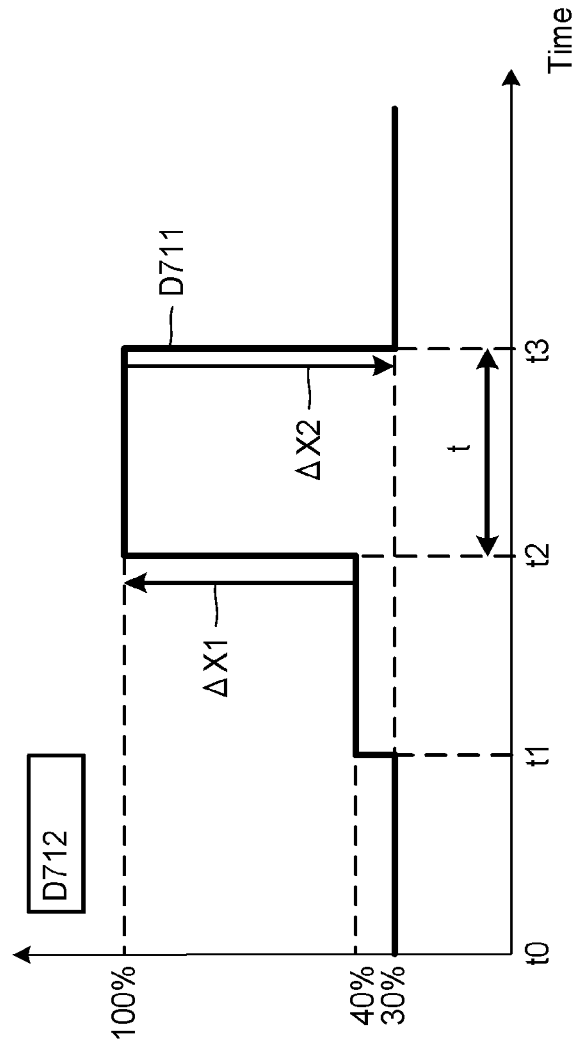
FIG. 5C is a chart illustrating a state of obtaining a dry-wet alternate time t from the turbine operating data D711 in the embodiment.

FIG. 5C is a chart illustrating a state of obtaining the dry-wet alternate time t from the turbine operating data D711 in the embodiment. FIG. 5C exemplifies the operating time, including the time from the time point t0 to the time point t3, when the steam turbine 3 is operated, similarly to FIG. 5A and FIG. 5B.

As illustrated in FIG. 5C, the dry-wet alternate time calculation unit 712 sets a time point at which an increasing amount of a value in the turbine operating data D711 exceeds a predetermined threshold value ΔX1 (for example, 50%) as a starting point of the dry-wet alternate time t. Then, the dry-wet alternate time calculation unit 712 detects the starting point of the dry-wet alternate time t in the turbine operating data D711, thereafter setting a time point at which a decreasing amount of a value in the turbine operating data D711 exceeds a predetermined threshold value ΔX2 (for example, 50%) as an end point of the dry-wet alternate time t. Then, the dry-wet alternate time calculation unit 712 calculates a time between the starting point of the dry-wet alternate time t and the end point of the dry-wet alternate time t as the dry-wet alternate time t. Although not illustrated, the dry-wet alternate time t also includes a case of setting a time point at which a decreasing amount of a value in the turbine operating data D711 exceeds a predetermined threshold value ΔX1 (for example, 50%) as a starting point, and setting a time point at which an increasing amount of a value in the turbine operating data D711 exceeds a predetermined threshold value ΔX2 (for example, 50%) as an end point. That is, the dry-wet alternate time t also includes the case of setting the time point at which the change amount (the increasing amount or the decreasing amount) of the value in the turbine operating data D711 exceeds the predetermined threshold value ΔX1 (for example, 50%) as the starting point, and setting the time point at which the change amount (the decreasing amount or the increasing amount) of the value in the turbine operating data D711 exceeds the predetermined threshold value ΔX2 (for example, 50%) as the end point.

The calculation of the dry-wet alternate time t is performed on each of the plurality of turbine stages 60 constituting the steam turbine 3. Note that the threshold value ΔX1 and the threshold value ΔX2 are set individually in each of the plurality of turbine stages 60. Note that the threshold value ΔX1 and the threshold value ΔX2 are set to decrease with going from the initial stage to the final stage of the turbine blades.

In this manner, the dry-wet alternate time calculation unit 712 calculates, based on the turbine operating data D711, the dry-wet alternate time t during which the dry-wet alternate zone develops in each of the plurality of turbine stages 60 when the operation is actually performed in the steam turbine 3. The dry-wet alternate time calculation unit 712 outputs the data on the calculated dry-wet alternate time t as the dry-wet alternate time data D712.

[D-1-3] Working Medium Impurity Concentration Calculation Unit 721

As illustrated in FIG. 4, the working medium impurity concentration calculation unit 721 is configured such that a steam temperature data D11 and a water quality data D20 are input thereto to output a working medium impurity concentration data D721 based on the steam temperature data D11 and the water quality data D20.

The steam temperature data D11 is data on a temperature T of steam supplied to the steam turbine 3 when the operation is actually performed in the steam turbine 3. The water quality data D20 is data on water quality of feedwater supplied to the steam source 2 when the operation is actually performed in the steam turbine 3, and for example, includes data of an acid conductivity κ and data of pH. The working medium impurity concentration data D721 is date on a working medium impurity concentration Cw which is an impurity concentration of the steam supplied to the steam turbine 3 when the operation is actually performed in the steam turbine 3. The steam temperature data D11, the water quality data D20, and the working medium impurity concentration data D721 are, for example, data on the operating time, including the time from the time point t0 to the time point t3, when the steam turbine 3 is operated (refer to FIG. 5A, FIG. 5B, and so on) though illustration thereof is omitted.

The impurity concentration (Na, Cl, $SO_4$) Cw in the wording medium, which affects pitting corrosion, is calculated by using a function f1(κ, pH, T) determined by time course data of serving the acid conductivity κ and the pH of the feedwater supplied to the steam source 2 and the temperature T of the steam (main steam) supplied as the working medium to the steam turbine 3 as variables, as represented by the following (formula I). Note that the function f1(κ, pH, T) is a function resulting from examination of a relationship between the variables, and A and B are constants determined from the pH and the temperature T.

$$Cw=f1(\kappa,pH,T)=A\cdot\kappa^{B} \quad \text{(formula I)}$$

In this manner, the working medium impurity concentration calculation unit 721 calculates, based on the water quality data D20 and the steam temperature data D11, the working medium impurity concentration Cw, to output the data on the calculated working medium impurity concentration Cw as the working medium impurity concentration data D721.

[D-1-4] Deposit Impurity Concentration Calculation Unit 730

As illustrated in FIG. 4, the deposit impurity concentration calculation unit 730 is configured such that the dry-wet alternate time data D712 (=t), the steam temperature data D11, the working medium impurity concentration data D721 (=Cw), and a steam flow rate data D12 (=v) are input thereto to output a deposit impurity concentration data D730 (=C).

The steam flow rate data D12 is data on a steam flow rate v of the steam supplied to the steam turbine 3 when the operation is actually performed in the steam turbine 3. The deposit impurity concentration data D730 is date on a deposit impurity concentration C which is an impurity concentration of a deposit accumulated on each of the plurality of turbine stages 60 when the operation is actually performed in the steam turbine 3. The steam flow rate data D12 and the deposit impurity concentration data D730 are, for example, data on the operating time, including the time from the time point t0 to the time point t3, when the steam turbine 3 is operated (refer to FIG. 5A, FIG. 5B, and so on) though illustration thereof is omitted.

The deposit impurity concentration C is an equivalent impurity concentration, and means, in a deposit accumulated with impurities contained in the steam, the proportion (ppm) of impurities contained as corrosive components (a plurality of components such as Na, Cl, and $SO_4$) in the steam to the accumulated deposit.

The deposit impurity concentration C is calculated by using a function f2(D(T,v), t, Cw) of serving an impurity deposition rate D(T,v), the dry-wet alternate time t, and the working medium impurity concentration Cw as variables, as represented by the following (formula II). The impurity deposition rate D(T,v) is calculated by the function of serving the temperature T of the steam and the steam flow rate v as variables. Note that the function f2(D(T,v), t, Cw) and the function f2(D(T,v)) are functions each resulting from examination of a relationship between the variables.

$$C=f2(D(T,v),t,Cw) \quad \text{(formula II)}$$

Figure 5D:
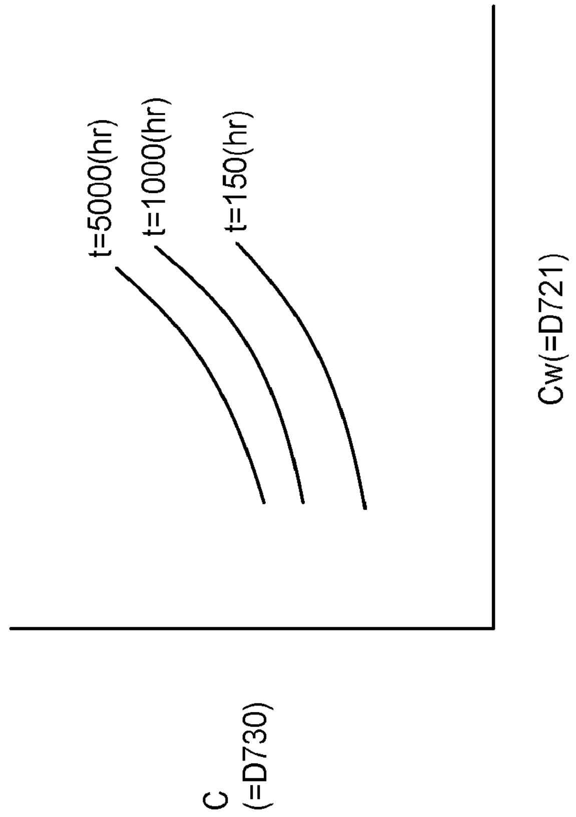
FIG. 5D is a chart illustrating a relationship between a deposit impurity concentration C, a working medium impurity concentration Cw, and the dry-wet alternate time t in the embodiment.

FIG. 5D is a chart illustrating a relationship between the deposit impurity concentration C, the working medium impurity concentration Cw, and the dry-wet alternate time t in the embodiment.

As illustrated in FIG. 5D, the deposit impurity concentration C increases exponentially with an increase in the working medium impurity concentration Cw. Further, the deposit impurity concentration C increases with an increase in the dry-wet alternate time t.

In this manner, the deposit impurity concentration calculation unit 730 calculates, based on the steam temperature data D11, the steam flow rate data D12, the working medium impurity concentration data D721, and the dry-wet alternate time data D712, the deposit impurity concentration C, to output the data on the calculated deposit impurity concentration C as the deposit impurity concentration data D730.

[D-1-5] Pit Initiation Evaluation Unit 740

As illustrated in FIG. 4, to the pit initiation evaluation unit 740, the dry-wet alternate time data D712 (=t), the deposit impurity concentration data D730 (=C), and a pit initiation data D30 are input.

The pit initiation data D30 is date on pitting corrosion initiated in each of the plurality of turbine stages 60 when the operation is actually performed in the steam turbine 3. The pit initiation data D30 is obtained by examining whether or not the pitting corrosion is initiated in the rotor blade 50 in each of the plurality of turbine stages 60, for example. The pitting corrosion is judged as being initiated by the examination when a depth of a pit caused by corrosion exceeds 0.2 mm, for example.

Then, the pit initiation evaluation unit 740 creates and retains the pit initiation evaluation table D740 based on the dry-wet alternate time data D712 (=t), the deposit impurity concentration data D730 (=C), and the pit initiation data D30.

Figure 5E:
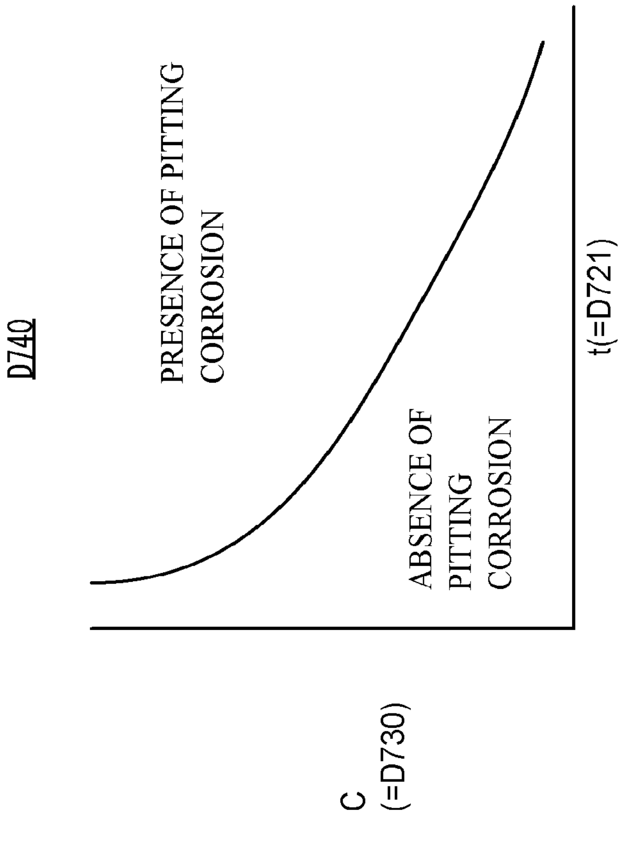
FIG. 5E is a chart illustrating the pit initiation evaluation table D740 in the embodiment.

FIG. 5E is a chart illustrating the pit initiation evaluation table D740 in the embodiment.

As illustrated in FIG. 5E, the pit initiation evaluation table D740 is a table relating a relationship between the presence and the absence of pit initiation to the dry-wet alternate time t and the deposit impurity concentration C. To the pit initiation evaluation unit 740, a plurality of data sets relating the dry-wet alternate time data D712 (=t), the deposit impurity concentration data D730 (=C), and the pit initiation data D30 are input, and for example, by performing an interpolation process on the data sets, the pit initiation evaluation table D740 is created.

As illustrated in FIG. 5E, the pit initiation evaluation table D740 is configured to include a boundary dividing an area having the pit initiation and an area having no pit initiation in an orthogonal coordinate system specified by a coordinate axis of the dry-wet alternate time t and a coordinate axis of the deposit impurity concentration C. As can be judged from the pit initiation evaluation table D740, the longer the dry-wet alternate time t becomes, the more likely the pitting corrosion is to be initiated, and the higher the deposit impurity concentration C becomes, the more likely it is to be initiated. The pit initiation evaluation table D740 is created for each of the plurality of turbine stages 60.

[D-2] Evaluation of Pitting Corrosion in Operation Plan for Steam Turbine 3

In the pit initiation evaluation system 700, as described above, after creating the pit initiation evaluation table D740, by using the pit initiation evaluation table D740, the evaluation of the pitting corrosion to be initiated in each of the plurality of turbine stages 60 in an operation planned for the steam turbine 3 is performed. Here, for example, the evaluation of the pitting corrosion is performed on the steam turbine 3 after repairing the pitting corrosion. Further, the evaluation of the pitting corrosion may be performed on the same type of another steam turbine 3 as that of the steam turbine 3 obtaining the examination result of the pitting corrosion.

Figure 6:
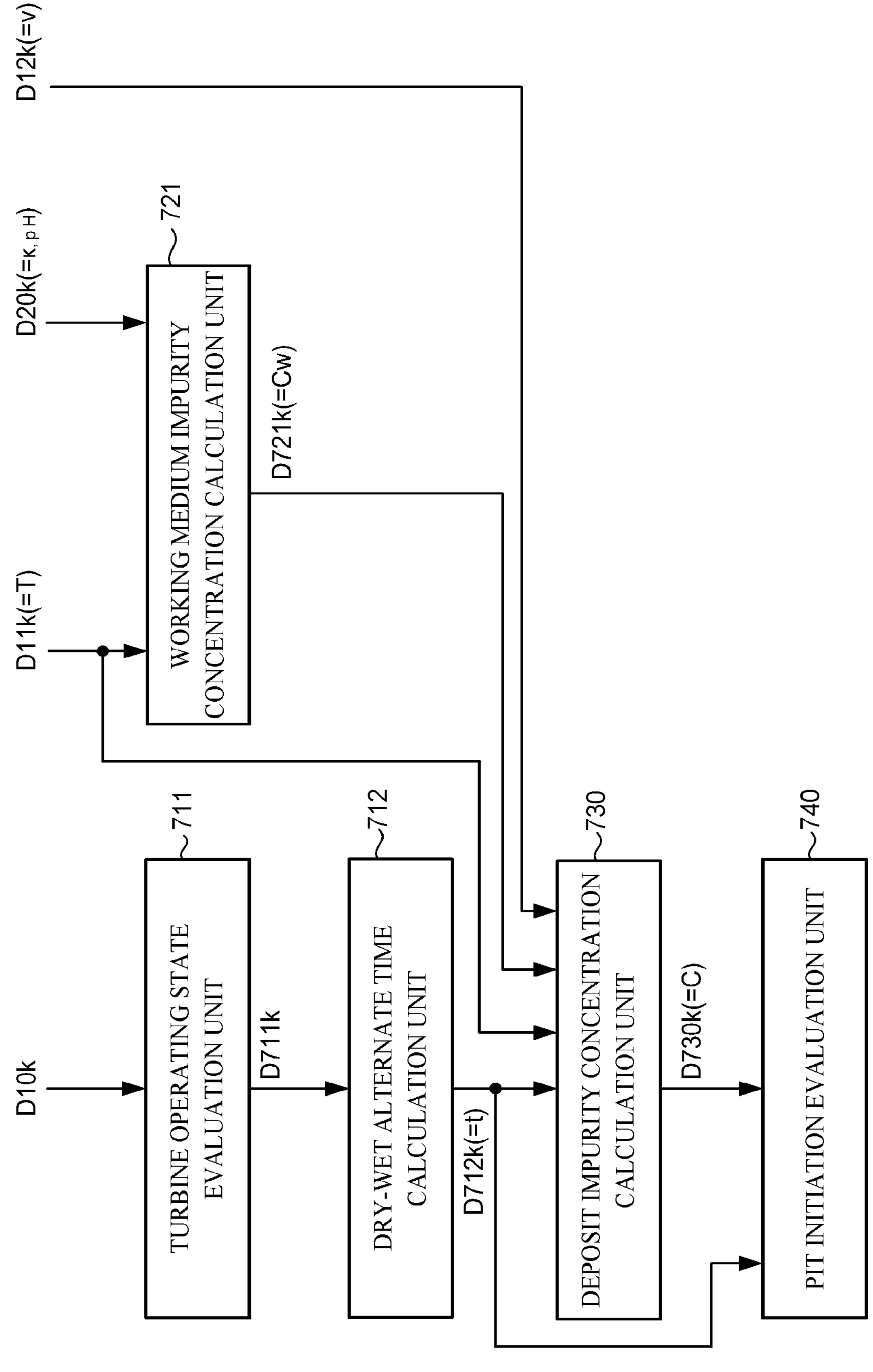
FIG. 6 is a diagram schematically illustrating a flow of data for evaluation of pit initiation by using the pit initiation evaluation table D740 in the pit initiation evaluation system 700 according to the embodiment.

FIG. 6 is a diagram schematically illustrating a flow of data for the evaluation of the pit initiation by using the pit initiation evaluation table D740 in the pit initiation evaluation system 700 according to the embodiment.

In the pit initiation evaluation system 700, the operation of each of the units when the evaluation of the pitting corrosion is performed using the pit initiation evaluation table D740 will be described using FIG. 6.

[D-2-1] Turbine Operating State Evaluation Unit 711

As illustrated in FIG. 6, the turbine operating state evaluation unit 711 is configured such that a power output data D10*k* is input thereto to output a turbine operating data D711*k* based on the power output data D10*k*.

Here, similarly to the power output data D10 illustrated in FIG. 5A, the power output data D10*k* is data relating a power output amount P (MW) to an operating time (Time) of the steam turbine 3. However, the power output amount P of the power output data D10*k* is different from the power output data D10 illustrated in FIG. 5A to be the power output amount P in which the generator 4 outputs electric power in an operation plan for the steam turbine 3.

Further, similarly to the turbine operating data D711 illustrated in FIG. 5B, the turbine operating data D711*k* is data relating the operating time (Time) of the steam turbine 3 to a rate R (%). However, the rate R (%) of the turbine operating data D711*k* is different from that of the turbine operating data D711 illustrated in FIG. 5B to be the rate R (%) obtained by dividing the power output amount P in which the generator 4 outputs the electric power in the operation plan for the steam turbine 3 by the rated power output amount PR (R=100*P/PR).

In this manner, as illustrated in FIG. 6, the turbine operating state evaluation unit 711 calculates the rate R obtained by dividing the power output amount P in which the generator 4 outputs the electric power in the operation plan for the steam turbine 3 (=power output data D10*k*) by the rated power output amount PR, to output the data on the calculated rate R as the turbine operating data D711*k*.

[D-2-2] Dry-Wet Alternate Time Calculation Unit 712

As illustrated in FIG. 6, the dry-wet alternate time calculation unit 712 is configured such that the turbine operating data D711*k* is input thereto to output a dry-wet alternate time data D712*k* based on the turbine operating data D711*k*.

The dry-wet alternate time data D712*k* is different from the dry-wet alternate time data D712 illustrated in FIG. 5C to be data on a dry-wet alternate time t during which a dry-wet alternate zone develops in each of the plurality of turbine stages 60 in the operation plan for the steam turbine 3. The calculation of the dry-wet alternate time t of the dry-wet alternate time data D712*k* is performed similarly to that of the dry-wet alternate time data D712.

In this manner, as illustrated in FIG. 6, the dry-wet alternate time calculation unit 712 calculates, based on the turbine operating data D711*k*, the dry-wet alternate time t during which the dry-wet alternate zone develops in each of the plurality of turbine stages 60 in the operation plan for the steam turbine 3. Then, the dry-wet alternate time calculation unit 712 outputs the data on the calculated dry-wet alternate time t as the dry-wet alternate time data D712*k*.

[D-2-3] Working Medium Impurity Concentration Calculation Unit 721

As illustrated in FIG. 6, the working medium impurity concentration calculation unit 721 is configured such that a steam temperature data D11*k* and a water quality data D20*k* are input thereto to output a working medium impurity concentration data D721*k* based on the steam temperature data D11*k* and the water quality data D20*k*.

The steam temperature data D11*k* is different from the steam temperature data D11 illustrated in FIG. 4 to be data on a temperature T of steam to be supplied to the steam turbine 3 in the operation plan for the steam turbine 3. The water quality data D20*k* is different from the water quality data D20 illustrated in FIG. 4 to be data on water quality of feedwater to be supplied to the steam source 2 in the operation plan for the steam turbine 3, and for example, includes data of an acid conductivity κ and data of pH. To the steam temperature data D11*k* and the water quality data D20*k* in the operation plan corresponding to the power output data D10*k*, data obtained from a past operation history is also applicable. The working medium impurity concentration data D721*k* is different from the working medium impurity concentration data D721 illustrated in FIG. 4 to be date on a working medium impurity concentration Cw of the steam to be supplied to the steam turbine 3 in the operation plan for the steam turbine 3.

The working medium impurity concentration Cw which is the working medium impurity concentration data D721$k$ is calculated in a similar manner to that in the working medium impurity concentration Cw which is the above-described working medium impurity concentration data D721.

In this manner, as illustrated in FIG. 6, the working medium impurity concentration calculation unit 721 calculates, based on the water quality data D20$k$ and the steam temperature data D11$k$, the working medium impurity concentration Cw, to output the data on the calculated working medium impurity concentration Cw as the working medium impurity concentration data D721$k$.

[D-2-4] Deposit Impurity Concentration Calculation Unit 730

As illustrated in FIG. 6, the deposit impurity concentration calculation unit 730 is configured such that the dry-wet alternate time data D712$k$ (=t), the steam temperature data D11$k$, the working medium impurity concentration data D721$k$ (=Cw), and a steam flow rate data D12$k$ (=v) are input thereto to output a deposit impurity concentration data D730$k$ (=C).

The steam flow rate data D12$k$ is different from the steam flow rate data D12 illustrated in FIG. 4 to be data on a steam flow rate v of the steam to be supplied to the steam turbine 3 in the operation plan for the steam turbine 3. To the steam flow rate data D12$k$ in the operation plan corresponding to the power output data D10$k$, data obtained from the past operation history is also applicable similarly to the steam temperature data D11$k$ and the water quality data D20$k$. The deposit impurity concentration data D730$k$ is different from the deposit impurity concentration data D730 illustrated in FIG. 4 to be date on a deposit impurity concentration C of a deposit to be accumulated on each of the plurality of turbine stages 60 in the operation plan for the steam turbine 3. The calculation of the deposit impurity concentration C of the deposit impurity concentration data D730$k$ is performed similarly to that in the deposit impurity concentration data D730.

In this manner, the deposit impurity concentration calculation unit 730 calculates, based on the steam temperature data D11$k$, the steam flow rate data D12$k$, the working medium impurity concentration data D721$k$, and the dry-wet alternate time data D712$k$, the deposit impurity concentration C, to output the data on the calculated deposit impurity concentration C as the deposit impurity concentration data D730$k$.

[D-2-5] Pit Initiation Evaluation Unit 740

As illustrated in FIG. 6, to the pit initiation evaluation unit 740, the dry-wet alternate time data D712$k$ (=t) and the deposit impurity concentration data D730$k$ (=C) are input. Then, the pit initiation evaluation unit 740 performs the evaluation of pitting corrosion to be initiated in each of the plurality of turbine stages 60 in the operation plan for the steam turbine 3 by using the already created and retained pit initiation evaluation table D740 (refer to FIG. 5E).

Specifically, as illustrated in FIG. 5E, in the pit initiation evaluation table D740, the pit initiation evaluation unit 740 outputs the result of pit initiation, corresponding to both of the dry-wet alternate time t input as the dry-wet alternate time data D712$k$ and the deposit impurity concentration C input as the deposit impurity concentration data D730$k$, as the evaluation result. That is, in the pit initiation evaluation table D740, when a coordinate position of the dry-wet alternate time t input as the dry-wet alternate time data D712$k$ and the deposit impurity concentration C input as the deposit impurity concentration data D730$k$ is present in the area having the pit initiation, the pit initiation is evaluated as being present. In contrast to this, in the pit initiation evaluation table D740, when a coordinate position of the dry-wet alternate time t input as the dry-wet alternate time data D712$k$ and the deposit impurity concentration C input as the deposit impurity concentration data D730$k$ is present in the area having no pit initiation, the pit initiation is evaluated as being absent.

[E] Summary

As described above, in the pit initiation evaluation system 700 of this embodiment, by using various kinds of data obtained when the operation is actually performed in the steam turbine 3, the pit initiation evaluation table D740 presenting a relationship between the dry-wet alternate time t, the deposit impurity concentration C, and the pit initiation is created. Then, in the pit initiation evaluation system 700 of this embodiment, by using the pit initiation evaluation table D740, in the operation planned for the steam turbine 3, the pitting corrosion to be initiated in each of the plurality of turbine stages 60 is evaluated.

Hence, in this embodiment, even without providing a special sensor or the like in the steam turbine 3, the pit initiation can be effectively predicted. This allows appropriate maintenance and management of the steam turbine 3. As a result, in this embodiment, the occurrence of the stress corrosion cracking and the corrosion fatigue damage can be easily inhibited.

[F] Modified Example

In the above-described embodiment, the case of performing the evaluation of pitting corrosion on the steam turbine power generation system 1 illustrated in FIG. 1 by using the pit initiation evaluation system 700 has been described, but this is not restrictive. With respect to steam turbine power generation systems each including a steam turbine in which a dry-wet alternate zone develops, the pit initiation evaluation system 700 can be appropriately used. For example, with respect to a steam turbine power generation system including a geothermal turbine (intermediate-pressure turbine) to which steam generated by geothermal power is supplied as a working medium, the evaluation of pit initiation may be performed by using the pit initiation evaluation system 700.

<Others>

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

EXPLANATION OF REFERENCE SIGNS

1: steam turbine power generation system, 2: steam source, 3: steam turbine, 3$a$: high-pressure turbine, 3$b$: intermediate-pressure turbine, 3$c$: low-pressure turbine, 4: generator, 5: steam condenser, 6: feed pump, 10: outer casing, 11: lower exhaust port, 12: cone section, 20: inner casing, 30: turbine rotor, 40: stator blade, 41: diaphragm inner ring, 43: diaphragm outer ring, 45: nozzle diaphragm, 50: rotor blade, 60: turbine stage, 70: steam supply pipe, 301: rotor bearing, 700: pit initiation evaluation system, 711: turbine operating state evaluation unit, 712: dry-wet alternate time calculation unit, 721: working medium impurity concentration calculation unit, 730: deposit impurity concentration calculation unit, 740: pit initiation evaluation unit, AX: rotation center axis

What is claimed is:

1. A pit initiation evaluation system for evaluating, in a steam turbine power generation system including a steam turbine structured such that a plurality of turbine stages are arranged in an axial direction along a rotation center axis of a turbine rotor, and steam supplied from a steam source expands and works in sequence in each of the plurality of turbine stages to thereby rotate the turbine rotor, and a generator structured to generate electricity by rotation of the turbine rotor to thereby output electric power, pitting corrosion to be initiated in each of the plurality of turbine stages, the pit initiation evaluation system comprising:

a turbine operating state evaluation unit configured to calculate a rate of a power output amount in which the generator outputs electric power when an operation is actually performed in the steam turbine to a rated power output amount in which the generator generates electricity when a rated operation is performed in the steam turbine, the calculated rate being output as a turbine operating data;

a dry-wet alternate time calculation unit configured to calculate, based on the turbine operating data output by the turbine operating state evaluation unit, a dry-wet alternate time during which a dry-wet alternate zone develops in each of the plurality of turbine stages when the operation is actually performed in the steam turbine, the calculated dry-wet alternate time being output as a dry-wet alternate time data, the dry-wet alternate zone being a zone in which a transition from dry steam to wet steam takes place, the dry steam being water vapor not in coexistence with saturated liquid-phase water, the wet steam being water vapor in coexistence with saturated liquid-phase water;

a deposit impurity concentration calculation unit configured to calculate, based on a steam temperature data on a temperature of steam supplied to the steam turbine when the operation is actually performed in the steam turbine, a steam flow rate data on a steam flow rate of the steam supplied to the steam turbine when the operation is actually performed in the steam turbine, a working medium impurity concentration data on a working medium impurity concentration which is an impurity concentration of the steam supplied to the steam turbine when the operation is actually performed in the steam turbine, and the dry-wet alternate time data output by the dry-wet alternate time calculation unit, a deposit impurity concentration which is an impurity concentration of a deposit accumulated on each of the plurality of turbine stages when the operation is actually performed in the steam turbine, the calculated deposit impurity concentration being output as a deposit impurity concentration data; and a pit initiation evaluation unit configured to create and retain , based on the dry-wet alternate time data output by the dry-wet alternate time calculation unit, the deposit impurity concentration data output by the deposit impurity concentration calculation unit, and a pit initiation data on pitting corrosion initiated in each of the plurality of turbine stages when the operation is actually performed in the steam turbine, a pit initiation evaluation table presenting a relationship between the dry-wet alternate time, the deposit impurity concentration, and the pit initiation, the pit initiation evaluation unit being configured to evaluate, by using the pit initiation evaluation table, pitting corrosion to be initiated in each of the plurality of turbine stages in an operation planned for the steam turbine.

2. The pit initiation evaluation system according to claim 1, wherein the dry-wet alternate time calculation unit calculates the dry-wet alternate time by setting a time point at which a change amount of a value in the turbine operating data exceeds a predetermined threshold value as a starting point of the dry-wet alternate time, and setting a time point at which an increasing amount of a value in the turbine operating data exceeds a predetermined threshold value as an end point of the dry-wet alternate time.

3. The pit initiation evaluation system according to claim 1, further comprising a working medium impurity concentration calculation unit configured to calculate, based on a water quality data on water quality of feedwater supplied to the steam source when the operation is actually performed in the steam turbine, and the steam temperature data, a working medium impurity concentration, the working medium impurity concentration being output to the deposit impurity concentration calculation unit as the working medium impurity concentration data, wherein the water quality data includes data of an acid conductivity and data of pH.

4. A pit initiation evaluation method of evaluating, in a steam turbine power generation system including a steam source which generates steam by heating feedwater, a steam turbine structured such that a plurality of turbine stages are arranged in an axial direction along a rotation center axis of a turbine rotor, and steam supplied from the steam source expands and works in sequence in each of the plurality of turbine stages to thereby rotate the turbine rotor, and a generator structured to generate electricity by rotation of the turbine rotor to thereby output electric power, pitting corrosion to be initiated in each of the plurality of turbine stages, the pit initiation evaluation method comprising:

a turbine operating state evaluation step of calculating a rate of a power output amount in which the generator outputs electric power when an operation is actually performed in the steam turbine to a rated power output amount in which the generator generates electricity when a rated operation is performed in the steam turbine, the calculated rate being output as a turbine operating data;

a dry-wet alternate time calculation step of calculating, based on the turbine operating data output in the turbine operating state evaluation step, a dry-wet alternate time during which a dry-wet alternate zone develops in each of the plurality of turbine stages when the operation is actually performed in the steam turbine, the calculated dry-wet alternate time being output as a dry-wet alternate time data, the dry-wet alternate zone being a zone in which a transition from dry steam to wet steam takes place, the dry steam being water vapor not in coexistence with saturated liquid-phase water, the wet steam being water vapor in coexistence with saturated liquid-phase water;

a deposit impurity concentration calculation step of calculating, based on a steam temperature data on a temperature of steam supplied to the steam turbine when the operation is actually performed in the steam turbine, a steam flow rate data on a steam flow rate of the steam supplied to the steam turbine when the operation is actually performed in the steam turbine, a working medium impurity concentration data on a working medium impurity concentration which is an impurity concentration of the steam supplied to the steam turbine when the operation is actually performed in the steam turbine, and the dry-wet alternate time data output in the dry-wet alternate time calculation step, a deposit impurity concentration of a deposit accumulated on each of the plurality of turbine stages when the operation is actually performed in the steam turbine, the calculated deposit impurity concentration being output as a deposit impurity concentration data; and a pit initiation evaluation step of creating and retaining, based on the dry-wet alternate time data output in the dry-wet alternate time calculation step, the deposit impurity concentration data output in the deposit impurity concentration calculation step, and a pit initiation data on pitting corrosion initiated in each of the plurality of turbine stages when the operation is actually performed in the steam turbine, a pit initiation evaluation table presenting a relationship between the dry-wet alternate time, the deposit impurity concentration, and the pit initiation, the pit initiation evaluation step of evaluating, by using the pit initiation evaluation table, pitting corrosion to be initiated in each of the plurality of turbine stages in an operation planned for the steam turbine.

* * * * *